No. 613,732. Patented Nov. 8, 1898.
M. J. STEFFENS.
BICYCLE.
(Application filed Sept. 29, 1897.)
(No Model.)
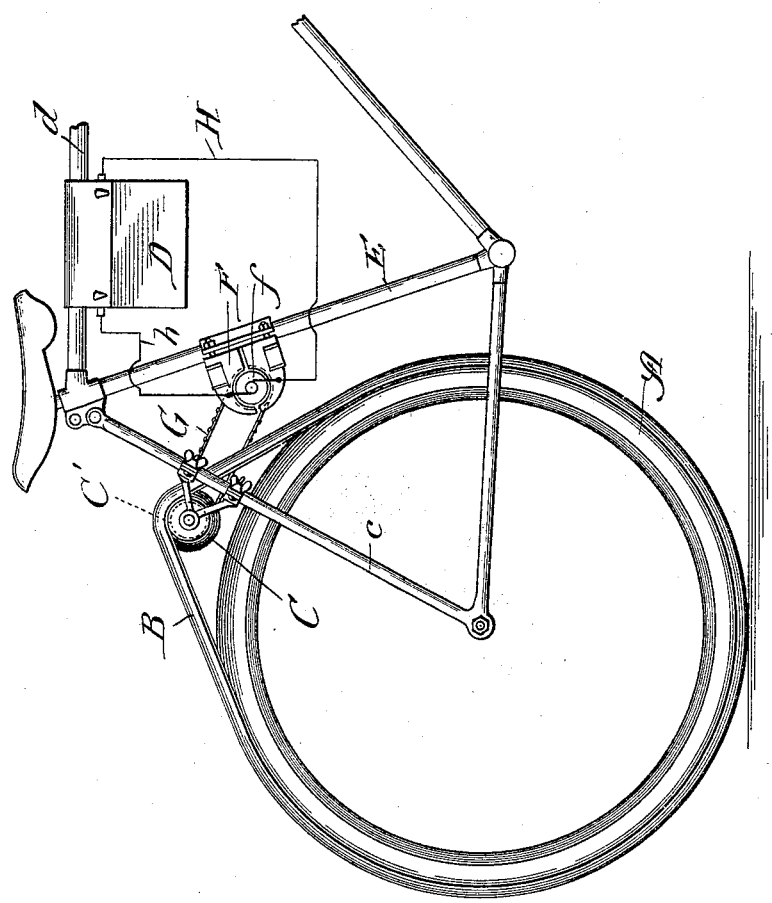

UNITED STATES PATENT OFFICE.

MATHEW JOSEPH STEFFENS, OF CHICAGO, ILLINOIS, ASSIGNOR OF ONE-HALF TO JOHN K. ROBINSON, OF SAME PLACE.

BICYCLE.

SPECIFICATION forming part of Letters Patent No. 613,732, dated November 8, 1898.

Application filed September 29, 1897. Serial No. 653,445. (No model.)

*To all whom it may concern:*

Be it known that I, MATHEW JOSEPH STEFFENS, a citizen of the United States, residing at Chicago, Illinois, have invented certain new and useful Improvements in Bicycles, of which the following is a specification.

The special object of my invention is to provide electrical means for propelling bicycles, tricycles, and other similar vehicles which may be applied to such vehicles as now constructed; and my invention consists in the features and details of construction hereinafter described and claimed.

In the drawing I have shown a side elevation of the driving-wheel and a portion of the frame of a bicycle as usually constructed with my improvements arranged thereon.

In making my improvement in bicycles, tricycles, or similar vehicles I take a driving-wheel A of the usual construction and provide it with a pneumatic tire, such as is generally used. I make a belt B, cup-shaped in cross-section, as shown in the drawing, to permit it to be applied to the pneumatic tire of the wheel and properly fit and travel on the same. I arrange a pulley C, which has its shaft journaled in a bracket mounted on the fork c of the bicycle-frame at a desired distance above the wheel. This bracket may be attached to the frame in any desired way, but preferably with thumb-screws, to enable it to be readily put on and taken off or adjusted up and down, as may be found desirable. I mount a battery D upon the horizontal bar d of the bicycle-frame, provided with a desired number of cells, and, in other respects, adapted to furnish a current of electricity. I mount on the seat-post tube E a motor F, which may be of any desired kind and construction and which carries a sprocket-wheel f. This sprocket-wheel is provided with a sprocket-chain G, which passes around a sprocket-wheel C', mounted on the same shaft as the pulley C. Both the pulley C and the sprocket-wheel C' are fast to the shaft on which they are mounted, so that as the one is rotated the other will be also. Wires H and h pass from the battery to the motor to form an electric circuit.

In operation as the rider of the bicycle turns on the current, which may be done by a button or switch in any desired way, a circuit is formed for the electric current which causes the motor F to be set in operation and the sprocket-wheel f to be rotated. The rotation of the sprocket-wheel f through means of the sprocket-chain G imparts rotation to the sprocket-wheel C', which causes the pulley C to be rotated, and through means of the belt B rotation is imparted to the driving-wheel A, so that the vehicle is propelled forward. If desired, the vehicle may also be provided with means, as crank-shaft and pedals, to enable the rider to propel the same by foot in the usual way, so that he need only apply the electric motor at such times as he may desire.

By making the belt cup-shaped and having it pass around the periphery of the wheel-tire, so as to be between the tire and the ground, all slipping of the tire on the wheel is prevented and a large leverage is obtained for propelling the wheel forward; but while I prefer to make the belt of a form to fit the pneumatic tire of a wheel, yet, if desired, it may be made flat or round, in which case of course the periphery of the wheel would have to be provided with a flat surface or with a surface having a circumferential groove in it, as the case may be.

While I have described my invention with some minuteness of detail, I do not desire to limit myself to specific features of construction further than the same may be particularly mentioned and called for in the claims, as it is obvious that changes can be made in various parts without departing from the spirit of my invention.

What I regard as new, and desire to secure by Letters Patent, is—

1. In a bicycle or similar vehicle, the combination of a pulley having a periphery rounded in cross-section, means for rotating the pulley, a driving-wheel having a periphery rounded in cross-section, and a belt cup-shaped in cross-section running around the pulley and around the periphery of the driving-wheel and between the wheel and the ground, whereby leverage is obtained and slipping prevented, substantially as described.

2. In a bicycle or similar vehicle, the combination of a driving-wheel having a periphery rounded in cross-section, a battery, a motor, wires forming an electric circuit connecting the battery and the motor, a sprocket-wheel in the motor, a pulley having a periphery rounded in cross-section and a sprocket-wheel carried by the frame, a sprocket-chain connecting the sprocket-wheels, and a belt cup-shaped in cross-section running around the pulley and the periphery of the driving-wheel, substantially as described.

3. In a bicycle or similar vehicle, the combination of a frame, a driving-wheel, a battery supported on the upper horizontal member of the frame, a motor supported on the seat-post tube, electric wires forming a circuit between the battery and the motor, a sprocket-wheel in the motor, a pulley on the fork of the frame above the driving-wheel, a sprocket-wheel on the pulley-shaft, a sprocket-chain running from the sprocket-wheel on the motor to the sprocket-wheel on the pulley-shaft, and a belt running around the pulley in the frame and the periphery of the driving-wheel, substantially as described.

MATHEW JOSEPH STEFFENS.

Witnesses:
EPHRAIM BANNING,
THOMAS A. BANNING.